(12) United States Patent
Kellerman

(10) Patent No.: US 8,099,922 B2
(45) Date of Patent: Jan. 24, 2012

(54) ASSEMBLIES FOR CONSTRUCTING SOLAR PANEL MOUNTING SYSTEMS

(75) Inventor: Dallas Kellerman, Belleville, IL (US)

(73) Assignee: Cablofil, Inc., Mascoutah, IL (US)

( * ) Notice: Subject to any disclaimer, the term of this patent is extended or adjusted under 35 U.S.C. 154(b) by 44 days.

(21) Appl. No.: 12/795,827

(22) Filed: Jun. 8, 2010

(65) Prior Publication Data

US 2011/0296773 A1   Dec. 8, 2011

(51) Int. Cl.
*E04B 2/30*   (2006.01)
(52) U.S. Cl. ............... 52/483.1; 52/506.06; 403/256
(58) Field of Classification Search ............... 52/177, 52/483.1, 476, 489.1, 506.06, 653.1, 238.1, 52/235, 713; 403/252–256, 258, 260, 262, 403/264
See application file for complete search history.

(56) References Cited

U.S. PATENT DOCUMENTS

| | | | | |
|---|---|---|---|---|
| 1,620,130 A | * | 3/1927 | Pietzsch | 403/256 |
| RE21,793 E | * | 5/1941 | MacLean | 403/256 |
| 3,319,983 A | * | 5/1967 | Zibell | 403/400 |
| 4,899,510 A | * | 2/1990 | Propst | 52/238.1 |
| 5,579,621 A | * | 12/1996 | Fang | 52/483.1 |
| 6,722,357 B2 | | 4/2004 | Shingleton | |

* cited by examiner

*Primary Examiner* — Brian Glessner
*Assistant Examiner* — Brian D Mattei
(74) *Attorney, Agent, or Firm* — Bryan Cave LLP

(57) ABSTRACT

Mechanical clips and pier cap assemblies are provided that may be used to construct solar panel mounting frames. The assemblies include a pier cap that is configured to be attached to a top portion of a pier, which includes an opening and a flange stop. The flange stop is configured to support a solar panel mounting frame member. The assemblies further include a clip that has an aperture and a tab, with the tab being configured to be disposed through the opening in the pier cap. The assemblies further include a bolt and a nut, which are used to secure a solar panel mounting frame member to the pier cap.

18 Claims, 6 Drawing Sheets

ASSEMBLIES FOR CONSTRUCTING SOLAR PANEL MOUNTING SYSTEMS

FIELD OF THE INVENTION

The field of the present invention relates to solar energy production and, more particularly, to mechanical clip assemblies and pier caps that are used to construct solar panel mounting frames.

BACKGROUND OF THE INVENTION

Solar power has recently gained momentum as one of the leading renewable energy sources for today and beyond. Solar power is produced by converting sunlight into electricity using arrays of photovoltaics (PV)—or various other experimental technologies and materials. The arrays of photovoltaics, which are also generally referred to as "solar panels," are typically mounted to a frame in such a way as to maximize the exposure of such arrays to sunlight. The solar panel mounting frames often span a considerable geographical area, in order to capture a sufficient amount of sunlight to efficiently generate a relevant amount of electricity. For example, in 2007, a 75-megawatt (MW) solar energy generating system was constructed near Boulder City, Nev., which includes a field of solar panels that covers approximately 300 acres.

Additional solar fields are currently under construction, and many are in the early planning stages. Given the significant amount of geographical area that these solar energy generating systems cover, a significant demand exists for methods and devices that enable solar panel mounting frames to be quickly and efficiently assembled. As explained below, the present invention provides an improved mechanical clip and pier cap assembly, which may be used for constructing solar panel mounting frames.

SUMMARY OF THE INVENTION

According to certain aspects of the present invention, mechanical clip assemblies and pier caps are provided, which may be used to construct solar panel mounting frames. The invention generally comprises a pier cap that is configured to be attached to a top portion of a pier, which comprises an opening and a flange stop (which protrudes outward from a top surface of the pier cap). The invention provides that the flange stop is configured to support a solar panel mounting table/frame member resting thereon. The invention further comprises a clip that has an aperture located in a first side of the clip, and a tab located in a second side of the clip. The invention provides that the tab is configured to be disposed through the opening in the pier cap. The clip assemblies further include a bolt that is configured to be disposed through the aperture located in the clip, and attached thereto using a nut, including, but not limited to, a threaded channel nut. The bolt and nut serve to attach the clip to a solar panel mounting frame member. The invention provides that the foregoing assembly is used to secure the solar panel mounting frame member to the pier cap—which is, in turn, attached to a pier.

According to additional aspects of the present invention, methods for constructing solar panel mounting frames are provided, which generally comprise using the mechanical clip assemblies and pier caps in accordance with the description provided herein.

The above-mentioned and additional features of the present invention are further illustrated in the Detailed Description contained herein.

DETAILED DESCRIPTION OF THE INVENTION

The following will describe in detail several preferred embodiments of the present invention. These embodiments are provided by way of explanation only, and thus, should not unduly restrict the scope of the invention. In fact, those of ordinary skill in the art will appreciate upon reading the present specification and viewing the present drawings that the invention teaches many variations and modifications, and that numerous variations of the invention may be employed, used and made without departing from the scope and spirit of the invention.

The present invention provides an improved mechanical clip assembly and pier cap for attaching a solar panel mounting table/frame to a pier, which is a type of pedestal that is installed into the ground to support a solar panel mounting frame. As explained above, solar panels are often installed across a significant geographical area, requiring the construction of a large area of solar panel mounting frames—which are supported by a proportionally large number of piers. As demonstrated below, the mechanical clip assemblies and pier caps of the present invention will provide a means to more efficiently attach a plurality of solar panel mounting frames to a series of piers.

Figure 1:
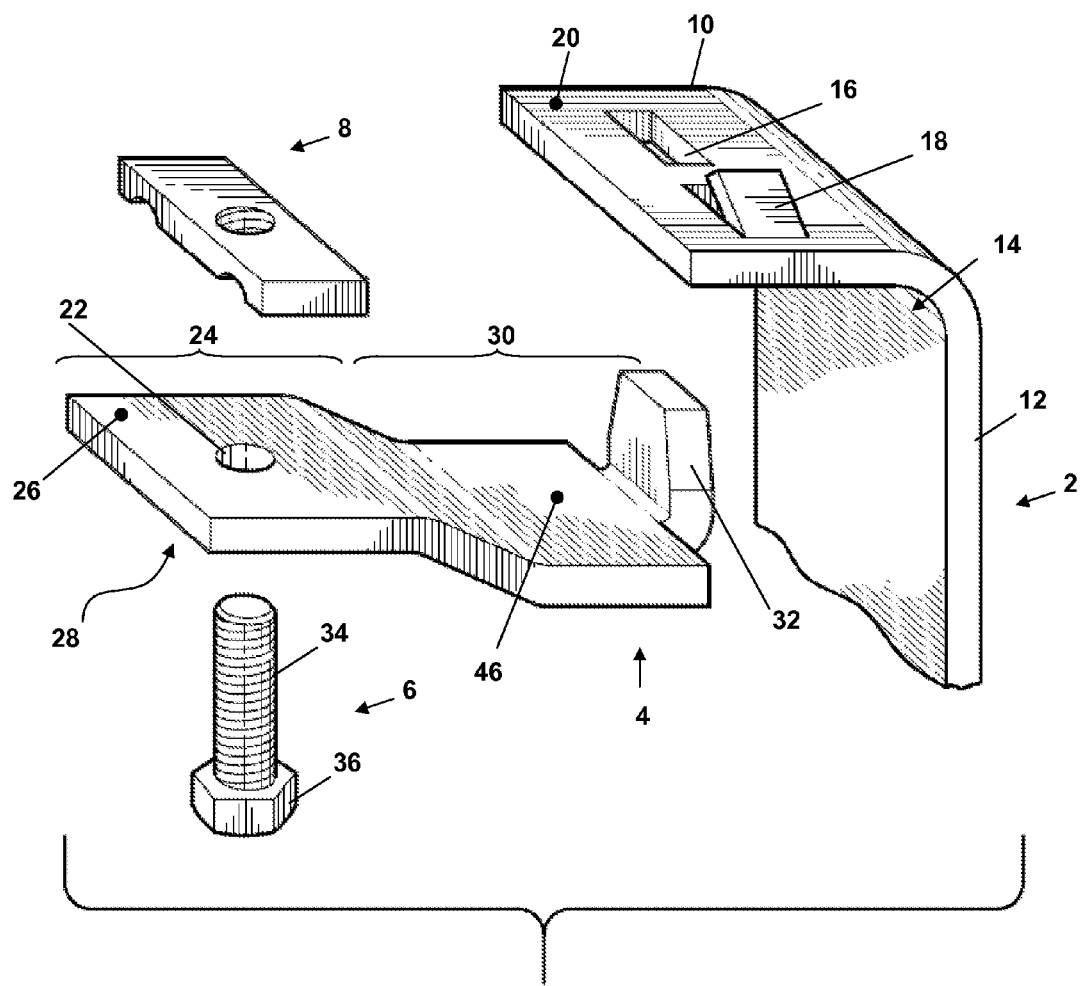
FIG. 1 is a disassembled view of the clip and pier cap assembly of the present invention.
Figure 2:
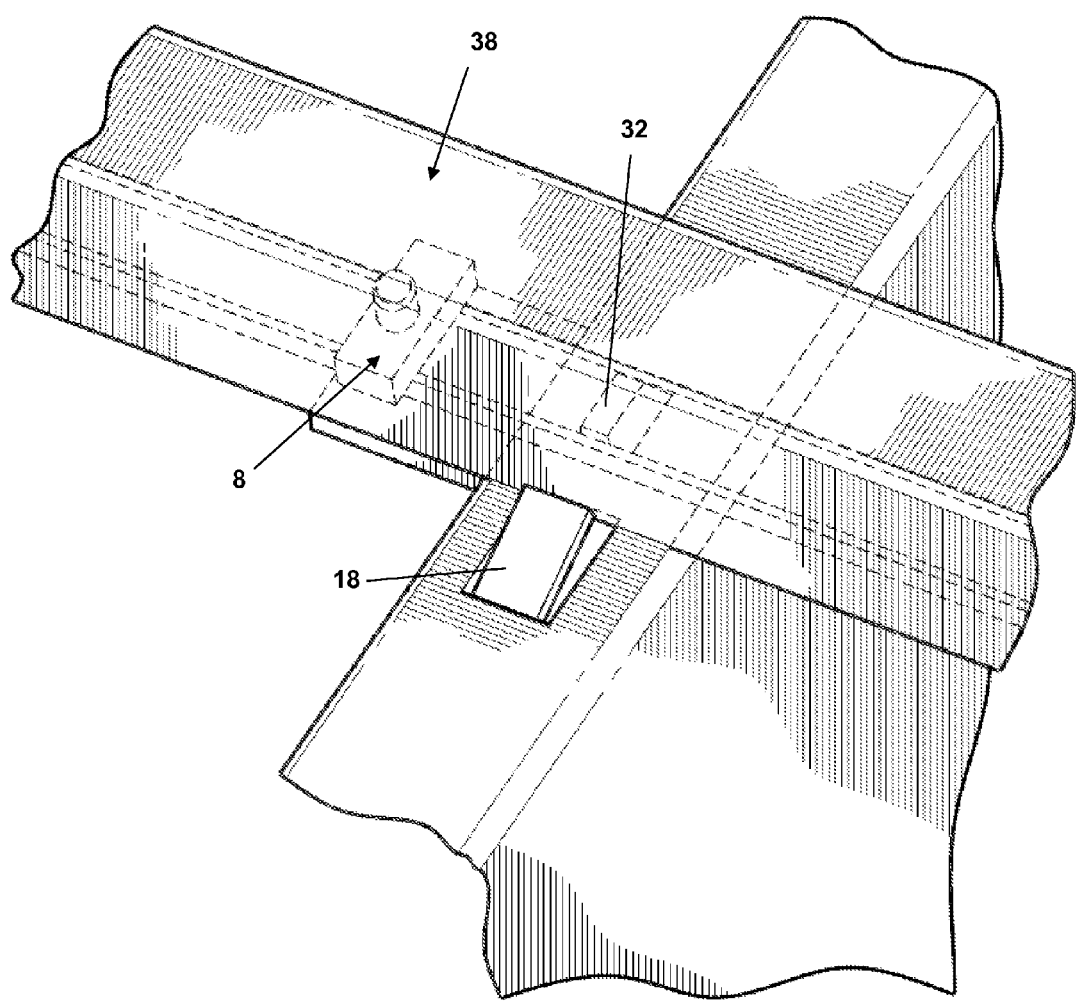
FIG. 2 is a top side, perspective view of the clip and pier cap assembly of the present invention.
Figure 3:
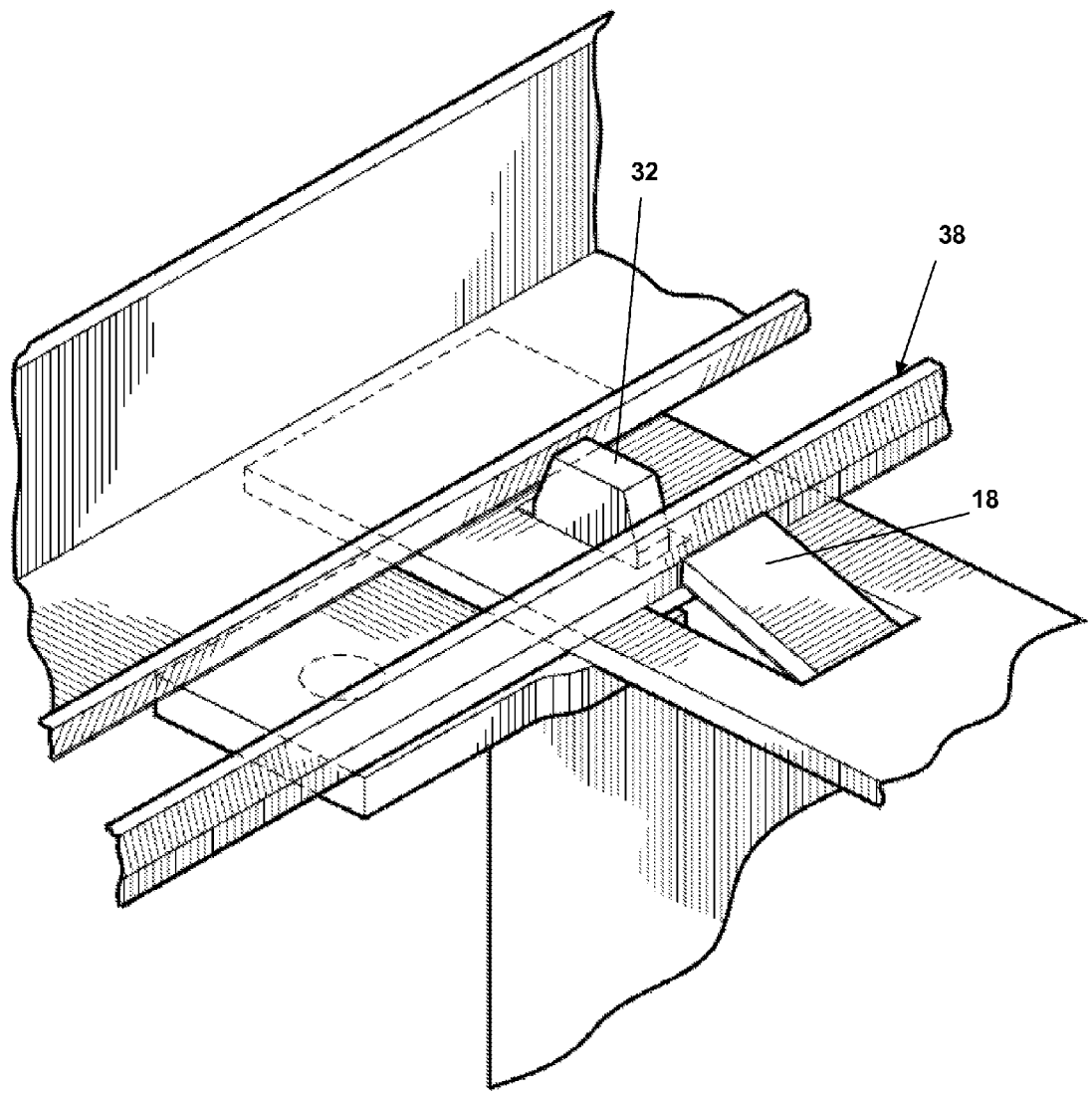
FIG. 3 is another top side, perspective view of the clip and pier cap assembly of the present invention.

Referring to FIG. 1, the present invention generally includes a pier cap 2, a clip 4, a bolt 6, and a nut 8, such as a threaded channel nut 8. The invention provides that the pier cap 2 is configured to be attached to the upper portion of a pier, in any of vary ways (e.g., mechanical attachments, welding, etc.). The pier cap 2 comprises a top portion 10, at least one side portion 12, and an optional bottom portion. The top portion 10 and at least one side portion 12 are joined together with an approximately ninety-degree angle 14 between the top portion 10 and at least one side portion 12. The pier cap 2 comprises an opening (or a slot) 16 disposed through the top portion 10 thereof. Although the opening 16 shown in the Figures exhibits a rectangular configuration, the invention provides that the opening 16 may exhibit other shapes, provided that the tab 32 (discussed below) in configured to be disposed through the opening 16 as described herein. In addition, the pier cap 2 includes a flange stop 18 that protrudes away from a top surface 20 of the top portion 10 of the pier cap 2. The invention provides that the flange stop 18 is configured to support a solar panel mounting frame member 38 (FIGS. 2 and 3) resting thereon. More particularly, when deployed over a geographical area, across a series of piers, a plurality of flange stops 18 (within a plurality of pier caps 2) will serve to support a steel bar member (or solar panel mounting frame member 38) resting thereon.

The assembly of the present invention further comprises a clip 4, which includes a first half 24 that comprises an aperture 22 extending from a top surface 26 through a bottom surface 28 of the first half 24 of the clip 4. In addition, the clip 4 includes a second half 30 that comprises a tab 32 that is approximately perpendicular with a plane of the top surface 26 of the first half 24 of the clip 4. The invention provides that the tab 32 is configured to be disposed through the opening 16 located in the top portion 10 of the pier cap 2, as shown in FIGS. 2-6. According to certain embodiments, the invention provides that the clip 4 comprises a portion 46 that is recessed relative to the top surface 26 of the first half 24 of the clip 4.

The assembly of the present invention further comprises a bolt 6 that includes a threaded portion 34 which is configured to be disposed through the aperture 22 at the bottom surface 28 of the first half 24 of the clip 4, such that a head portion 36 of the bolt 6 may reside adjacent to the bottom surface 28 of the first half 24 of the clip 4. The assembly further comprises a nut 8, such as a threaded channel nut 8, which is configured to receive and be attached to the threaded portion 34 of the bolt 6 at the top surface 26 of the first half 24 of the clip 4. The nut 8 will preferably exhibit a rectangular shape. The invention provides that the nut 8, along with the bolt 6, are configured to secure the solar panel mounting frame member 38 to the clip 4, which is in turn attached to a pier cap. Notwithstanding the foregoing, in certain alternative embodiments, other attachment means may be used to secure the solar panel mounting frame member 38 to the clip 4, such as mechanical snaps, rivets, adhesives, magnets, welding, and others.

Figure 4:
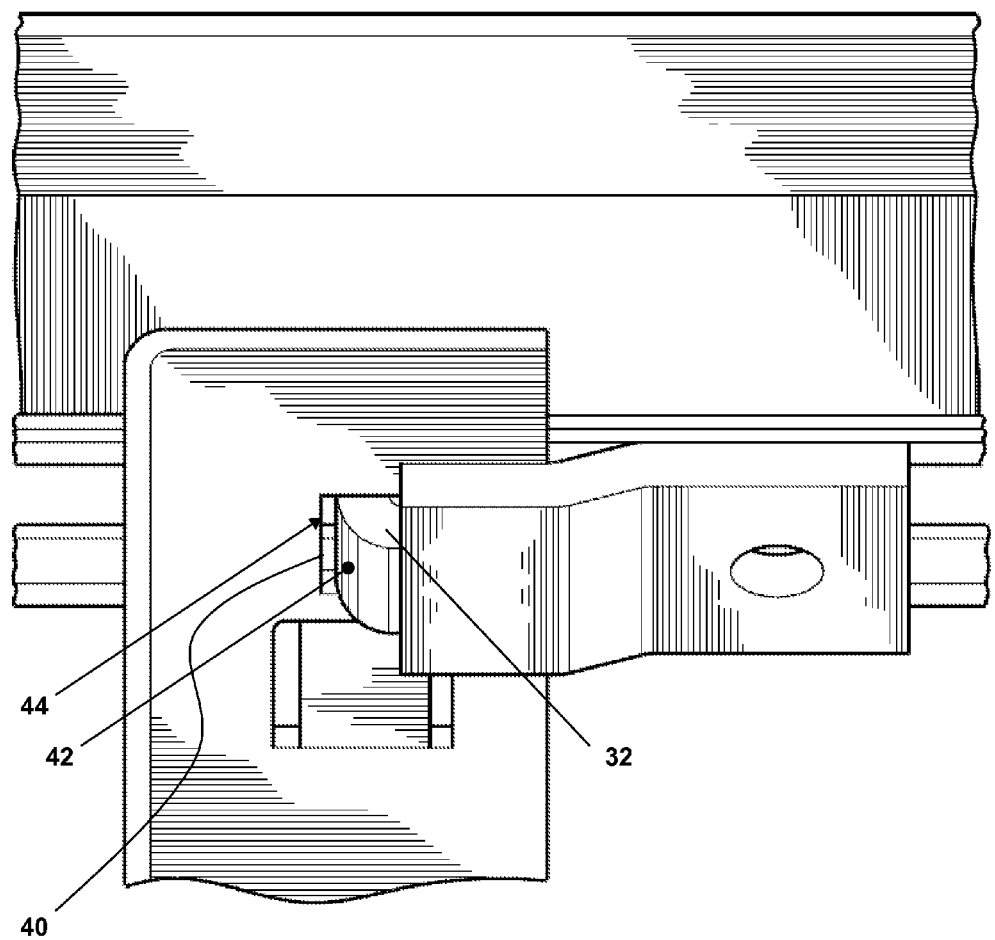
FIG. 4 is a bottom side view of the clip and pier cap assembly of the present invention.
Figure 5:
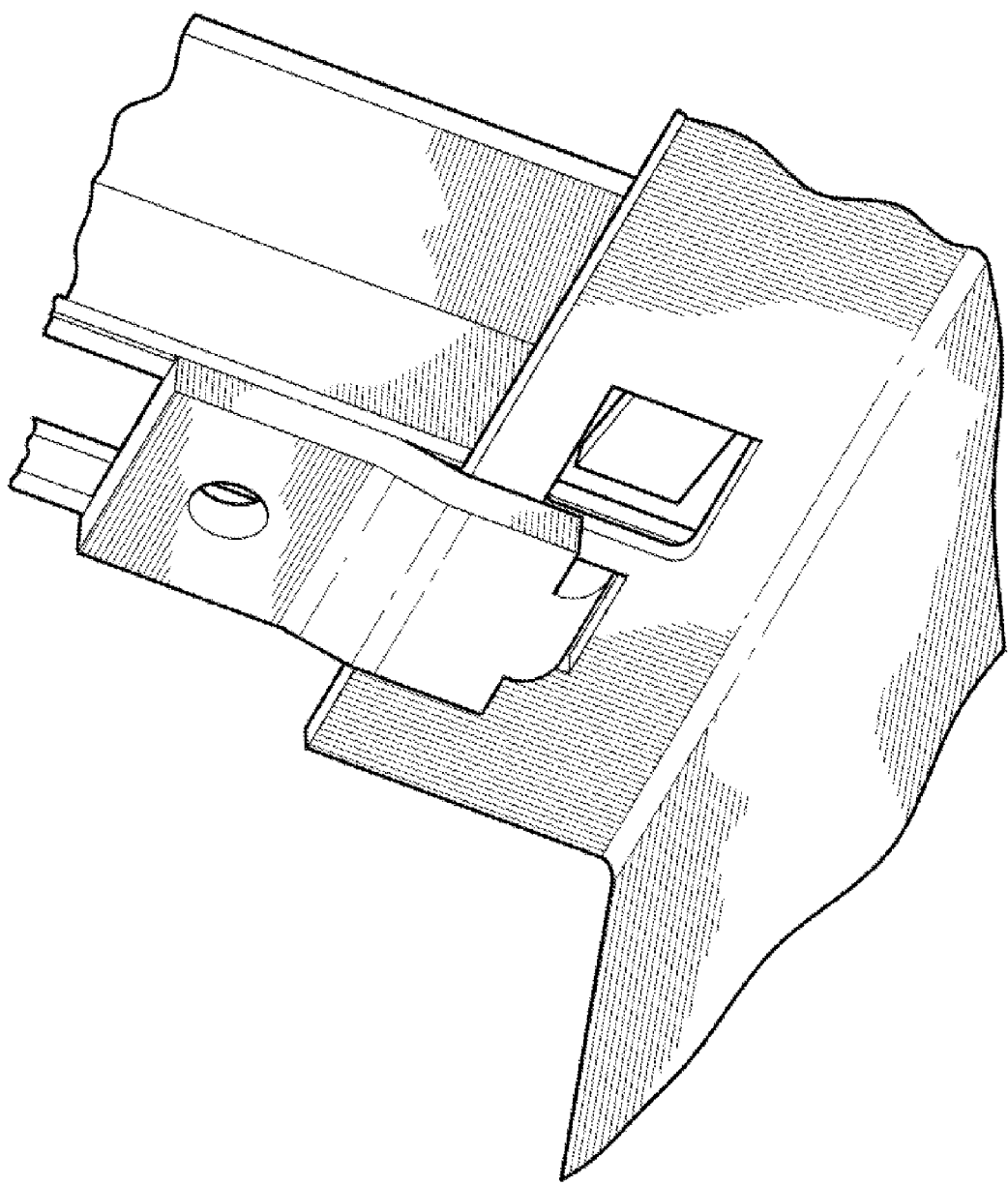
FIG. 5 is a bottom side, perspective view of the clip and pier cap assembly of the present invention.
Figure 6:
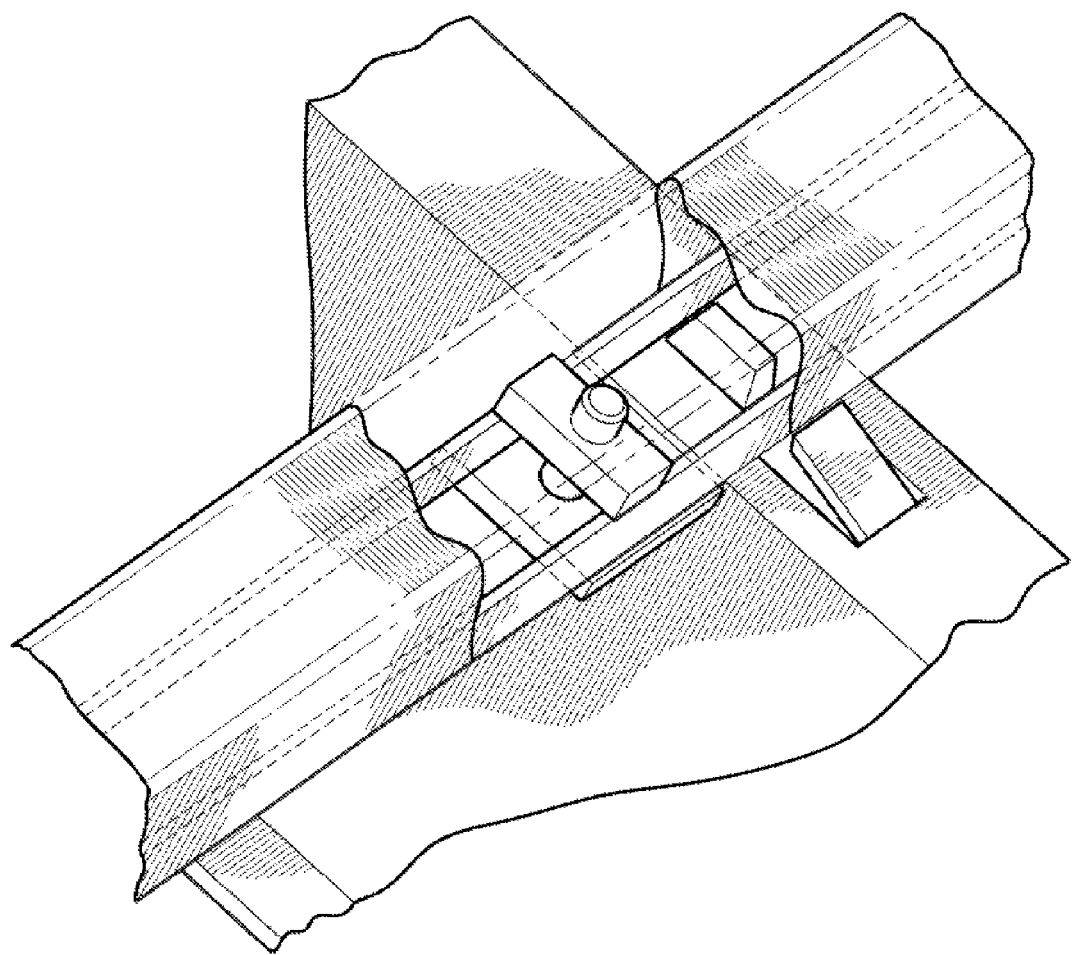
FIG. 6 is another top side, perspective view of the clip and pier cap assembly of the present invention.

Referring now to FIG. 4, when the tab 32 of the clip 4 is disposed through the opening 16 of the pier cap 2, a gap 40 may exist between a side surface 42 of the tab 32 and a side surface 44 of the opening 16. The invention provides that the gap 40 may be approximately 0.1 mm to 5 mm or, more preferably, approximately 0.1 mm to 3 mm. The invention provides that the gap 40 is preferred to accommodate and make room for the expansion of the pier cap 2, clip 4, bolt 6, nut 8, and, more importantly, the solar panel mounting frame member 38, which occurs during a rise in temperature. Solar panels are often installed in geographical regions, e.g., desert regions, which may experience significant changes in temperature during a 24 hour period (e.g., from mid-day to midnight). A dramatic temperature change will cause large metallic structures, such as a series of connected solar panel mounting frame members 38, to expand and contract in response to such temperature variances. The invention provides that the gap 40 allows for such expansion and contraction of the solar panel mounting frame members 38, and prevents a series of the solar panel mounting frame members 38 from otherwise buckling in response to elevated temperatures. In certain alternative embodiments, when the tab 32 of the clip 4 is disposed through the opening (or slot) 16 of the pier cap 2, a gap may exist between the entire perimeter of the tab 32 and the opening (or slot) 16.

The invention provides that the pier cap 2, clip 4, bolt 6 and nut 8 of the present invention may be constructed using any suitable material, but will preferably be comprised of steel or other metallic materials and alloys. According to other embodiments, such components may be constructed using elastomers and/or other suitable polymers.

According to additional embodiments of the present invention, methods for constructing solar panel mounting frames are provided, which generally comprise using the pier cap 2, clip 4, bolt 6 and nut 8, in accordance with the description provided herein.

Although certain example methods, apparatus, and/or articles of manufacture have been described herein, the scope of coverage of this disclosure is not limited thereto. On the contrary, this disclosure covers all methods, apparatus, and/or articles of manufacture fairly falling within the scope of the appended claims either literally or under the doctrine of equivalents.

What is claimed is:

1. An assembly for attaching a solar panel mounting frame to a pier, which comprises:
   (a) a pier cap that is configured to be attached to an upper portion of a pier, wherein the pier cap comprises a top portion and at least one side portion, which are joined together with an approximately ninety-degree angle between the top portion and at least one side portion, wherein the pier cap comprises (i) an opening disposed through the top portion and (ii) a flange stop that protrudes away from a top surface of the top portion, wherein the flange stop is configured to support a solar panel mounting frame member;
   (b) a clip that comprises (i) a first half that comprises an aperture extending from a top surface through a bottom surface of the first half and (ii) a second half that comprises a tab that is approximately perpendicular with a plane of the top surface of the first half, wherein the tab is configured to be disposed through the opening disposed in the top portion of the pier cap;
   (c) a bolt that includes a threaded portion which is configured to be disposed through the aperture at the bottom surface of the first half of the clip, such that a head portion of the bolt may reside adjacent to the bottom surface of the first half of the clip; and
   (d) a nut that is configured to receive and be attached to the threaded portion of the bolt at the top surface of the first half of the clip, wherein the nut is configured to secure the solar panel mounting frame member to the pier cap.

2. The assembly of claim 1, wherein a gap exists between a side surface of the tab and a side surface of the opening, when the tab of the clip is disposed through the opening in the top portion of the pier cap.

3. The assembly of claim 2, wherein the gap ranges in width from about 0.1 mm to about 3 mm.

4. The assembly of claim 1, wherein the nut comprises a rectangular shape.

5. The assembly of claim 1, wherein the clip comprises a middle portion that is recessed relative to the top surface of the first half of the clip.

6. An assembly for attaching a solar panel mounting frame to a pier, which comprises:
   (a) a pier cap that is configured to be attached to an upper portion of a pier, wherein the pier cap comprises (i) an opening disposed therethrough and (ii) a flange stop that protrudes away from a top surface of pier cap, wherein the flange stop is configured to support a solar panel mounting frame member;
   (b) a clip that comprises (i) a first half that comprises an aperture extending from a top surface through a bottom surface of the first half and (ii) a second half that comprises a tab that is approximately perpendicular with a plane of the top surface of the first half, wherein the tab is configured to be disposed through the opening disposed in the pier cap;
   (c) a bolt that includes a threaded portion which is configured to be disposed through the aperture at the bottom surface of the first half of the clip, such that a head portion of the bolt may reside adjacent to the bottom surface of the first half of the clip; and
   (d) a nut that is configured to receive and be attached to the threaded portion of the bolt at the top surface of the first half of the clip, wherein the nut is configured to secure the solar panel mounting frame member to the pier cap.

7. The assembly of claim 6, wherein a gap exists between a side surface of the tab and a side surface of the opening, when the tab of the clip is disposed through the opening in the top portion of the pier cap.

8. The assembly of claim 7, wherein the gap ranges in width from about 0.1 mm to about 3 mm.

9. The assembly of claim 6, wherein the nut comprises a rectangular shape.

10. The assembly of claim 6, wherein the clip comprises a middle portion that is recessed relative to the top surface of the first half of the clip.

11. An assembly for attaching a solar panel mounting frame to a pier, which comprises:
(a) a pier cap that is configured to be attached to an upper portion of a pier, wherein the pier cap comprises (i) an opening disposed therethrough and (ii) a flange stop that protrudes away from a top surface of pier cap, wherein the flange stop is configured to support a solar panel mounting frame member;
(b) a clip that comprises (i) a first half that comprises an aperture extending from a top surface through a bottom surface of the first half and (ii) a second half that comprises a tab that is approximately perpendicular with a plane of the top surface of the first half, wherein the tab is configured to be disposed through the opening disposed in the pier cap;
(c) a bolt that includes a threaded portion which is configured to be disposed through the aperture at the bottom surface of the first half of the clip, such that a head portion of the bolt may reside adjacent to the bottom surface of the first half of the clip; and
(d) a nut that is configured to receive and be attached to the threaded portion of the bolt at the top surface of the first half of the clip, wherein the nut is configured to secure the solar panel mounting frame member to the pier cap, wherein a gap exists between a side surface of the tab and a side surface of the opening, when the tab of the clip is disposed through the opening in the top portion of the pier cap.

12. The assembly of claim 11, wherein the gap ranges in width from about 0.1 mm to about 3 mm.

13. The assembly of claim 12, wherein the nut comprises a rectangular shape.

14. The assembly of claim 13, wherein the clip comprises a middle portion that is recessed relative to the top surface of the first half of the clip.

15. An assembly for attaching a solar panel mounting frame to a pier, which comprises:
(a) a pier cap that is configured to be attached to an upper portion of a pier, wherein the pier cap comprises a top portion and at least one side portion, which are joined together with an approximately ninety-degree angle between the top portion and at least one side portion, wherein the pier cap comprises (i) an opening disposed through the top portion and (ii) a flange stop that protrudes away from a top surface of the top portion, wherein the flange stop is configured to support a solar panel mounting frame member;
(b) a clip that comprises (i) a first half and (ii) a second half that comprises a tab that is approximately perpendicular with a plane of a top surface of the first half, wherein the tab is configured to be disposed through the opening disposed in the top portion of the pier cap; and
(c) an attachment means to secure the first half of the clip to the solar panel mounting frame member, thereby securing the solar panel mounting frame member to the pier cap.

16. The assembly of claim 15, wherein a gap exists between a side surface of the tab and a side surface of the opening, when the tab of the clip is disposed through the opening in the top portion of the pier cap.

17. The assembly of claim 16, wherein the gap ranges in width from about 0.1 mm to about 3 mm.

18. The assembly of claim 17, wherein the clip comprises a middle portion that is recessed relative to the top surface of the first half of the clip.

* * * * *